United States Patent [19]

Warren

[11] 4,161,548

[45] Jul. 17, 1979

[54] MAKING LONG YOLK HARD COOKED EGGS

[76] Inventor: William Warren, 729 S. Main St., Centerville, Mass. 02632

[21] Appl. No.: 872,372

[22] Filed: Jan. 26, 1978

[51] Int. Cl.² ............................................. A23L 1/32
[52] U.S. Cl. .................................... 426/299; 426/614
[58] Field of Search ................. 426/299, 614; 99/485, 99/646 R, 348

[56] References Cited

U.S. PATENT DOCUMENTS

| | | | |
|---|---|---|---|
| 1,635,843 | 7/1927 | Hofmann | 426/299 |
| 2,676,631 | 4/1954 | Wood | 99/485 X |
| 2,760,763 | 8/1956 | Harper | 426/299 X |
| 2,800,409 | 7/1957 | Webb et al. | 426/299 X |

*Primary Examiner*—Robert A. Yoncoskie
*Attorney, Agent, or Firm*—Charles R. Fay

[57] ABSTRACT

Making hard cooked eggs with elongated yolks so that when the egg is transversely sliced, each section of the egg including the ends, contain a part of the yolk.

6 Claims, 10 Drawing Figures

MAKING LONG YOLK HARD COOKED EGGS

BACKGROUND OF THE INVENTION

Up to the present invention persons preparing hard cooked eggs have been limited to the natural internal shape or layout of the egg and this is limited to a well defined ovoid white layer extending inward to a spheroid yolk area which is confined to the size of the yolk sac surrounding the yolk. Hard cooked eggs are often sliced crosswise into sections and very often the white and the yolk separate and fall apart due to the fact that they are of greatly different materials and particularly to the smooth almost polished surface of the egg white.

This is because the yolk and the white are cooked as though each were in a separate container because the liquid yolk is held in the sac and there is no actual contact between the liquid yolk and the liquid white. Additionally there is a heavy concentration of egg white at each end of the egg and this is mainly due to the generally ovoid shape of the outside of the egg compared with the generally spheroid shape of the egg yolk.

The taste of the combined yolk and white in a cross-sectioned slice is pleasing to most people who, however, at the same time do not particularly care for the end slices which contain only the less flavorable somewhat rubbery cooked egg white.

Furthermore, in preparing hard cooked eggs the surface of the yolk is often darkened due to slight overcooking or too high a cooking temperature as for instance when the eggs are cooked with steam.

In preparing a hard cooked egg the chef is limited to the natural flavor of the egg and in order to modify this flavor it is necessary after cooking to remove the yolk to mix it with other ingredients, for instance making deviled eggs.

The present invention has for an object thereof to provide a method of preparing hard cooked eggs wherein there is an adhesion or blending between the yolk and the white so that when sliced the white and the yolk will not fall apart.

Another object of the invention is to provide a method of expanding the size of the yolk to conform to the outside shape of the egg so that a normally sized cross sectional slice will always have both yolk and white therein even at the ends of the egg. In doing this the yolk area is changed from spheroidal to ovoid shape.

A further object of the invention is to provide a method of processing which avoids the darkened or blackish area often found on the surface of the yolk due to extra high temperature or over cooking.

A still further object of the invention is to provide a method of modifying the flavor of the hard cooked egg during the process of preparing the same thereby avoiding the necessity of manually removing the yolk and blending spices and deviling the egg, etc., and in connection therewith the present invention includes a method of introducing any flavor desired to the egg during the process of preparing it. If desired a somewhat different natural taste which may be more palatable to some people who do not care for the taste of hard cooked eggs can be provided by the present invention.

DESCRIPTION OF THE PRIOR ART

The closest prior art is Harper, U.S. Pat. No. 2,760,763, Aug. 1956.

SUMMARY OF THE INVENTION

An avian egg is partly cooked e.g., for about three minutes. This leaves close to the shell a thin layer of hard cooked egg white, another layer of partially cooked egg white and a greater area therein of uncooked egg white which surrounds the raw yolk, and it is to be noted that all the egg white is ovoid in shape while the yolk is spherical.

After the first cooking step above-described, the egg is homogenized by a mixer element in the form of a bent pin or the like such as is disclosed in co-pending application Ser. No. 677,450, filed Apr. 15, 1976.

This action thoroughly mixes the uncooked yolk and the uncooked egg white within the layer of cooked egg, and it also mixes in the partially cooked white which is blended with the raw egg white and the yolk all of which now appears in ovoid form conforming to the outside shape of the egg.

The mixer element or needle is now removed and in so doing the cooked white of the egg closes the opening therein formed by the insertion of the needle into the egg.

The egg is now hard cooked with a mixed yolk and white as described and when it is fully cooked it can be shelled and sliced crosswise providing a number of parallel flat sections all of which contains cooked egg white blended with cooked mixed egg white and yolk, and these adhere together in each slice as well as at the ends of the egg because the yolk sac has been disrupted and mixed in.

If a hollow mixing element or needle is used, various concentrated flavorings may be injected either at the start of the homogenizing action or during the mixing of the egg liquid after the three minute cooking in order to provide any flavors that may be desired in the finished egg.

PREFERRED EMBODIMENT OF THE INVENTION

Figure 1:
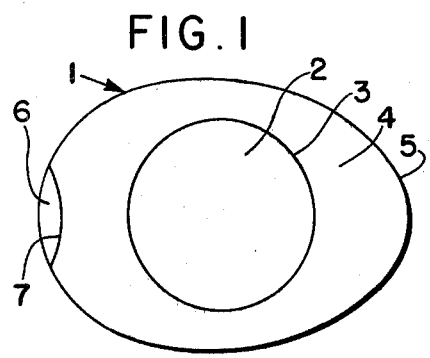
FIG. 1 is a representation of an uncooked avian egg.

FIG. 1 shows an uncooked avian egg indicated generally by the reference numeral 1 having a yolk 2 surrounded by a yolk sac 3, the yolk and yolk sac being generally spherical and surrounded by the liquid egg white 4 which is ovoid in conformance with the shell indicated at 5.

These eggs are provided with an air cell at the larger end thereof as at 6, the same having a membrane 7 maintaining the air sac. This end of the egg may be pierced if desired in order to let out the air in the sac while the egg is being cooked.

Figure 2:
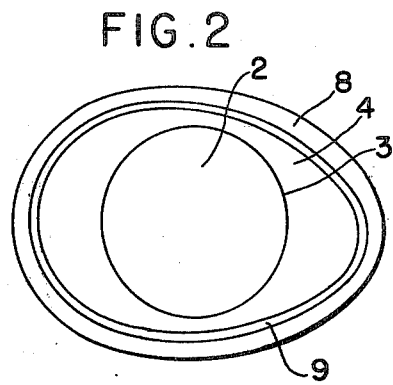
FIG. 2 is a similar view showing a partly cooked egg.

The partially cooked egg shown in FIG. 2, besides the elements indicated in FIG. 1, has hard cooked egg white layer 8, and partially cooked egg white 9, the part 4 still being raw.

Figure 3:
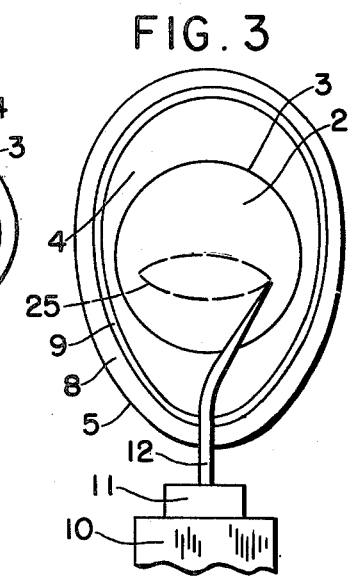
FIG. 3 illustrates the homogenizing step.
Figure 4:
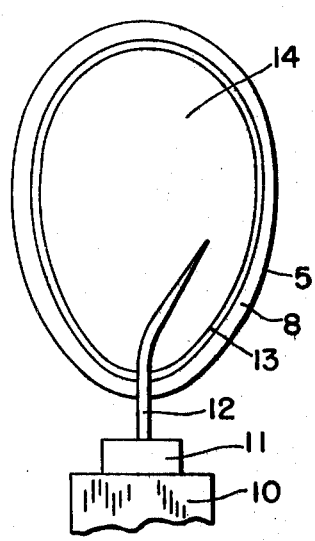
FIG. 4 illustrates how the inside of the egg appears upon the completion of the homogenizing step.

FIG. 3 illustrates the egg mixer motor 10 with chuck 11 and egg homogenizer element 12 which easily penetrates through the egg shell, membrane and hard cooked egg white, as well as the partially cooked egg white 9, into the yolk, and the reference character 25 illustrates the path of the point of the mixer element or needle. This mixer element or needle which is powered by any kind of high speed motor desired is rapdily rotated for only a few seconds, whereupon the partially cooked egg white is blended with the mixed fluid egg white and yolk and the yolk sac is completely disintegrated so that, therefore, as indicated by the reference numeral 13 a bond is created between the mixed blended egg white and yolk at 14 and the cooked egg white 8. The liquid egg contents are completely mixed and homogenized within the partially cooked egg white or the fully cooked egg white 8 and it will be seen, therefore, that this mixture is greatly elongated and takes the shape of the egg in contra-distinction to the spherical shape of the original yolk.

Figure 5:
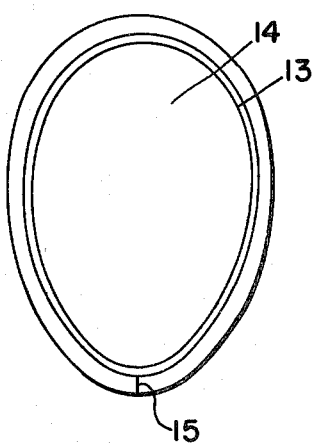
FIG. 5 illustrates the egg with the mixer element opening closed and the mixer element removed, the egg now being ready for final cooking.

In FIG. 5 the reference character 15 indicates the point of passage of the mixing needle or element 12, and when this is withdrawn after the homogenization step in the process, this opening is closed due to the springy effect of the cooked and partially cooked white of the egg 8 and 13 so that the egg in the shell now resembles a raw egg and can be handled in the same way and it can be completely hard cooked in the normal manner.

Figure 6:
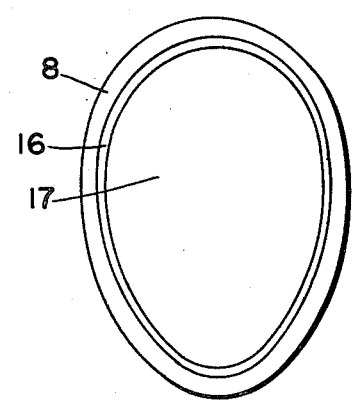
FIG. 6 shows the egg as it appears when finally hard cooked.

In FIG. 6 the reference character 16 is intended to indicate the cooked egg white blended with the mixed cooked egg white and the yolk making a strong bond between the same, and the reference character 17 indicates the cooked mixed egg white and yolk. As far as the egg is concerned and before it is shelled for consumption, this the complete modified hard cooked egg with long oblong or ovoid yolk.

Figure 7:
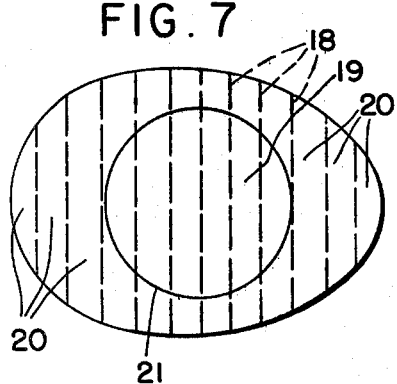
FIG. 7 illustrates the sectioning of a hard cooked standard egg.

FIG. 7 shows a standard shelled hard cooked egg with slice lines as at 18 indicated sections when cut in the usual manner and 19 indicates the usual hard cooked egg yolk. The numeral 20 indicates slices with egg white only, there being as shown several at each end of the egg, and at 21 there is the distinct yolk and white separation, with a weak bond between the two, so that the yolk is apt to fall out of the encircling cooked white.

Figure 8:
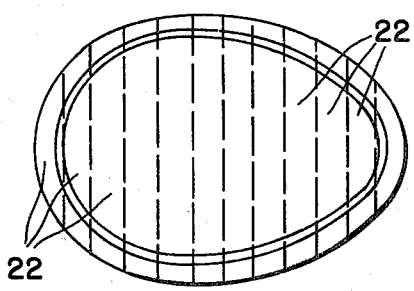
FIG. 8 is a similar view illustrating the hard cooked egg of the present invention when sliced.
Figure 9:
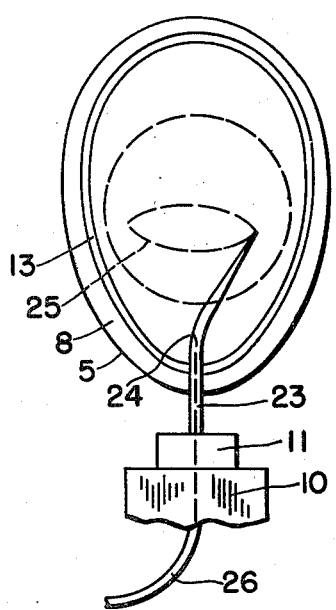
FIG. 9 shows a hollow needle for inserting flavorings into the egg and at the same time being used for homogenizing the egg.

FIG. 8 shows the same slicing action applied to a hard cooked egg of the present invention. The reference characters 22 all indicate different slices of different portions of the egg but they each contain white of egg blended with cooked mixed egg white and yolk so that each slice contains some of the yolk, which is bonded to the white.

In a modification of this invention the needle is shown at 23 and is indicated as being hollow with an outlet at 24, the path of the point of the needle being shown at 25. In this case it is possible to inject small amounts of various concentrated flavorings as desired into the liquid egg portion after the egg has been soft boiled, and this can be done with a needle at the start of the homogenizing process with the needle in fixed position, or during the homogenization or combination of the egg fluid.

Figure 10:
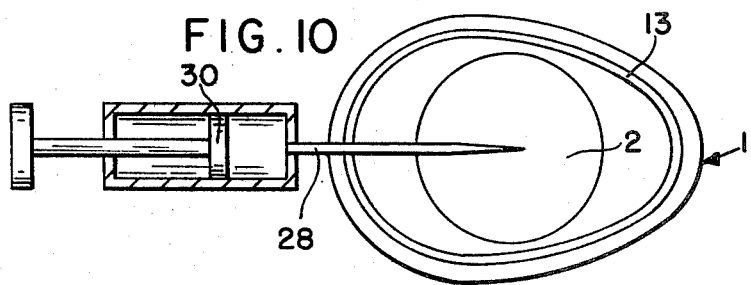
FIG. 10 is a view illustrating the insertion of material into the egg.

As shown in FIG. 10, the flavoring or coloring material may be inserted by a needle 28 of conventional type by means of a plunger, also conventional, as at 30. This is preferably done after soft cooking and prior to mixing by needle 12.

I claim:
1. The method of preparing a hard cooked avian egg having an elongated or ovoid yolk and white mixture extending substantially from end to end of the cooked egg, which comprises cooking an egg for a time sufficient to soft boil it such that a thin layer of hard cooked egg white is formed adjacent the shell,
   mixing the uncooked internal liquid in the egg,
   and completing the cooking of the entire egg.
2. The method of claim 1 including the step of injecting flavoring material into the uncooked internal liquid subsequent to the first cooking step.
3. The method of claim 1 including the injection of coloring material into the uncooked internal liquid in the egg during the mixing step.
4. The method of claim 1 wherein the step of mixing of the uncooked internal liquid is by means of a bent needle having a portion thereof generally coaxial with the long axis of the egg and a terminal portion at an angle with respect thereto.
5. The method of claim 2 wherein the injection step includes injecting the flavoring material through a hollow needle into the inner part of the egg.
6. The method of claim 1 wherein the mixing step includes homogenization.

* * * * *